| United States Patent [19] | [11] 3,895,069 |
|---|---|
| Atkinson et al. | [45] July 15, 1975 |

[54] PROCESS FOR THE PREPARATION OF 2,4,6-TRIALKYL-4-ALKYLTHIO OR 4-ALKOXYCYCLOHEXADI-2,5-ENE-1-ONES

[75] Inventors: John Halstead Atkinson; Duncan Clark, both of Stockton-on-Tees, England

[73] Assignee: Imperial Chemical Industries Limited, London, England

[22] Filed: Feb. 20, 1973

[21] Appl. No.: 334,191

[30] Foreign Application Priority Data
Mar. 6, 1972 United Kingdom............... 10290/72

[52] U.S. Cl.......................... 260/586 R; 260/613 D
[51] Int. Cl. C07c 43/22; C07c 45/16; C07c 149/26
[58] Field of Search......... 260/396 N, 613 D, 586 R

[56] References Cited
UNITED STATES PATENTS
2,908,692  10/1959  Richert............................ 260/396 N
3,631,185  12/1971  Laufer............................. 260/586 R Primary Examiner—Vivian Garner
Attorney, Agent, or Firm—Cushman, Darby & Cushman

[57] ABSTRACT

Cyclohexadienones are produced by reacting trialkyl phenols with alcohols or thiols and an alkyl or aralkyl hypochlorite in the presence of an acid acceptor. The process is of particular use in the production of 2,4,6-tri-tert.butyl-4-methoxycyclohexadi-2,5-ene-1-one which is produced from 2,4,6-tri-tert.butylphenol and which may be converted in situ into 2,6-di-tert.butyl-4-methoxyphenol.

9 Claims, No Drawings

PROCESS FOR THE PREPARATION OF 2,4,6-TRIALKYL-4-ALKYLTHIO OR 4-ALKOXYCYCLOHEXADI-2,5-ENE-1-ONES

This invention relates to a chemical process.

This invention comprises a process for the production of a compound of formula

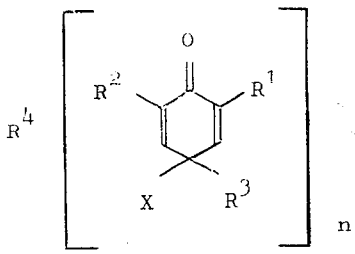

in which X is S or preferably O; $R^1$ and $R^2$ are individually alkyl groups having 4 to 12 carbon atoms and preferably being tertiary alkyl groups having 4 to 8 carbon atoms; $R^3$ is a tertiary alkyl group having 4 to 8 carbon atoms and $R^4$ is a residue derived from a thiol or alcohol having 1 to 20 carbon atoms and having $n$ SH or OH groups, and $n$ is 1, 2, 3 or 4, and preferably 1 or 2, and more preferably 1, by reacting a phenol of formula

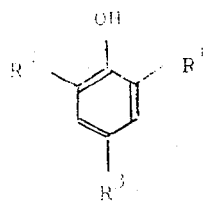

with an alcohol or thiol of formula $R^4(XH)_n$ and an alkyl or aralkyl hypochlorite which is preferably a tertiary alkyl hypochlorite having 4 to 8 carbon atoms, in the presence of an acid acceptor.

The alcohol or thiol preferably has 1 to 10 carbon atoms and may be, for example, ethylene glycol, hexane-1,6-diol, or preferably, a $C_1$ to $C_6$ alkanol such as ethanol or a propanol, or more preferably methanol.

The reaction may be carried out in the presence of a solvent which may be, for example, an aliphatic or cycloaliphatic hydrocarbon having 5 to 12 carbon atoms, or a halohydrocarbon, for example chloroform or carbon tetrachloride, dioxan, acetonitrile, an ether or dimethylformamide. However, the alcohol or thiol of formula $R(XH)_n$ may itself act as a solvent.

It is believed that the reaction occurs in solution but the phenol may be present as a suspension. In this case, as the phenol is consumed further phenol passes into solution.

In a particularly preferred form of the invention the alcohol is methanol, the phenol is 2,4,6-tri-tert.butyl phenol and the hypochlorite is tertiary butyl hypochlorite.

The acid acceptor may be an organic base, for example a primary, secondary or tertiary alkylamine having 1 to 6 carbon atoms which may be a mono- or dialkylamine, for example, trimethylamine or hexamethylenediamine or pyridine. It may also be an inorganic base soluble in the reaction medium, for example an alkali metal hydroxide or lower($C_1 - C_6$)alkoxide such as sodium or potassium hydroxide or methoxide, or preferably it may be an inorganic base insoluble in the reaction medium, for example an alkali or alkaline earth metal carbonate or bicarbonate such as sodium or potassium carbonate or bicarbonate, calcium carbonate or an alkaline earth metal hydroxide such as calcium hydroxide.

The reaction may be carried out at a wide range of pressures, for example 0.5 to 100 atmospheres absolute, but is very conveniently carried out at pressures in the range 5 to 40, and preferably 10 to 40 atmospheres absolute. The reaction may be carried out at temperatures in the range 10° to 200°C and preferably 20° to 100°C and is suitably carried out under reflux.

It is preferred that the alcohol or thiol should be supplied in at least the stoichiometric quantity and when it is serving as a solvent it is preferred that from 10 to 50 moles be provided per mole of the phenol.

It is preferred that at least one mole, for example 1 to 2 moles of the hypochlorite be provided per mole of the phenol.

At least 0.9 and, preferably at least 1, for example 1 to 2 moles, of the acid acceptor is suitably provided per mole of hypochlorite.

When an inorganic base is used and the product is obtained as a solution it is often possible to filter off at this stage any unconsumed base and any chloride produced from the base, if necessary adjusting the solution to a temperature at which the product does not crystallise out. The product may, if desired, be converted to the corresponding phenol by elimination of the group $R^3$ as an olefine.

The process of the present invention is particularly applicable to the manufacture of 2,6-di-tert.butyl-4-methoxyphenol which may be derived from 2,4,6-tri-tert.butyl-4-methoxycyclohexadi-2,5-ene-1-one by removal of the 4-butyl group with simultaneous aromatisation (see our British Patent No. 1,307,841). In this embodiment of the invention the reaction is carried out in methanol which acts as both reaction medium and solvent. By choice of a suitable acid acceptor such as sodium carbonate co-product sodium chloride is produced which is insoluble in methanol and may be readily filtered off from the methanol solution of the cyclodienone. No further purification of the methanol solution is required and the debutylation may be carried out in situ by adding a debutylation catalyst, e.g. an acid such as sulphuric acid, p-toluene sulphonic acid, phosphoric acid or an acid activated earth, and heating at the reflux temperature of the solution. Following the debutylation the 2,6-di-tert.butyl-4-methoxyphenol crystallises from the methanol on cooling.

There have been alternative methods proposed for converting 2,4,6-tri-tert.butyl-4-methoxycyclohexadi-2,5-ene-1-one into 2,6-di-tert.butyl-4-methoxyphenol but they possess several disadvantages over the method described above. For example, it has been suggested that the cyclohexadienone be converted to the phenol by pyrolysis at 200° to 260°C. This route, however, requires that the relatively pure cyclohexadienone be used as starting material and also produces a number of by-products notably 2-tert.butyl-4-methoxyphenol, 2,4-di-tert.butylphenol and 2,4,6-tri-tert.butylphenol. As the main use of 2,6-di-tert.butyl-4-methoxyphenol is as a food anti-oxidant the occurrence of these by-products, as well as reducing the yield of the desired anti-oxidant also introduces a chance of contamination which would debar its use in food.

The formation of a methanol-insoluble chloride in the cyclohexadienone forming reaction is particularly significant in the production of 2,6-ditert.butyl-4-methoxyphenol because it enables the subsequent debutylation to be carried out in situ in the methanol. If a bromide, for example, is formed as coproduct instead of a chloride there is a greater likelihood of forming a methanol soluble product such as sodium bromide. In this case relatively involved techniques must be used to separate the bromide and cyclohexadienone, for if the latter remains contaminated with the bromide, then the effect of the acid debutylation catalyst is to liberate bromine which contaminates the 2,6-ditert.butyl-4-methoxyphenol colouring it yellow as well as rendering it unfit for use in food.

EXAMPLE 1

To a suspension of 32.8 g. of 2,4,6-tri-tert.-butylphenol in 216 g. of methanol contained in a 500 cc round bottomed flask equipped with stirrer, condenser and dropping funnel was added 14.0 g. of tert-.butylhypochlorite dropwise during 15 min. The temperature which increased from 26°C to 32°C during the addition was then raised to 52° – 54°C and maintained at this for 1 hour. The deep yellow solution resulting was allowed to cool to room temperature and stirred for a further 18 hours. At this point analysis by gas/liquid chromatography of resultant mixture showed the presence of 2,4,6-tri-tert.butylphenol (4.2 g.), 2,chloro-4,6-di-tert.butylphenol (7.8 g.) and 2,4,6-tri-tert.butyl-4-methoxycyclohexadi-2,4-ene-1-one (17.6 g.). The solution was refluxed for a further 5½ hours at 70° when GLC analysis showed the presence of 2-chloro-4,6-di-tert.butylphenol (10.4 g.), 2,4,6-tri-tert.butyl-4-methoxycyclohexadi-2,5-ene-1-one (3.1 g.) and 2,6-di-tert.butyl-4-methoxyphenol (13.4 g.).

EXAMPLE 2

27.1 g. of tert.butylhypochorite was added over a period of 1 hour at 50 to 55°C to a suspension of 20.0 g. of sodium carbonate in a solution of 65.6 g. of 2,4,6-tri-tert.butyl phenol in 182.0 g. of methanol contained in a round bottomed flask equipped with stirrer, condenser and dropping funnel, At the end of the addition the temperature was raised to 65°C and maintained at this for 3 hours. The solution was filtered hot, the inorganic solid wased with 10 cc of MeOH and the combined filtrate and washings returned to the reaction vessel and cooled to 20° – 25°C. 66.0 g. of 98% sulphuric acid was added dropwise to the well stirred slurry of 2,4,6-tri-tert.butyl-4-methoxycyclohexadi-2,5-ene-1-one in methanol during 20 minutes. The resulting mixture was then heated to steady reflux for 1 hour. Approximately 40 cc of distillate was then removed and the reaction mixture cooled to 20°C and filtered to give 46.2 g. of 3,5-di-tert.butyl-4-hydroxyanisole as white needles, m.pt. 102°C.

Further recrystallisation from methanol raised the melting point to 104°C.

I claim:

1. A process for the production of a compound of the formula

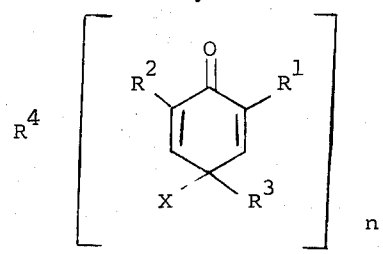

in which:
X is sulphur or oxygen;
$R^1$ and $R^2$ are individually alkyl groups having 4 to 12 carbon atoms;
$R^3$ is a tertiary alkyl group having 4 to 8 carbon atoms;
$R^4$ is a hydrocarbon residue derived from a thiol or alcohol having from 1 to 10 carbon atoms; and
$n$ is 1, 2, 3, or 4;
which comprises reacting a phenol of the formula:

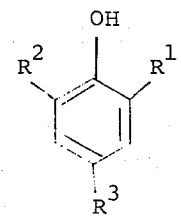

at a temperature range of 10° to 200°C and a pressure range of 0.5 to 100 atmospheres with an alcohol or thiol of the formula
$R^4(XH)_n$,
where $R^1$, $R^2$, $R^3$, $R^4$, X, and n are as defined above, and an alkyl hypochlorite in the presence of a base selected from the group consisting of primary, secondary and tertiary alkylamines having 1 to 6 carbon atoms, alkali metal hydroxides, alkali metal lower alkoxides, alkali metal carbonates, alkaline earth metal carbonates, alkali metal bicarbonates, alkaline earth metal bicarbonates and alkaline earth metal hydroxides.

2. A process as claimed in claim 1 in which $R^1$ and $R^2$ are tertiary alkyl groups having 4 to 8 carbon atoms.

3. A process as claimed in claim 1 in which the alcohol is ethylene glycol, hexane-1,6-diol, methanol, ethanol or a propanol.

4. A process as claimed in claim 1 in which a solvent is present.

5. A process as claimed in claim 4 in which the solvent is selected from the group consisting of an aliphatic or cycloaliphatic hydrocarbon having 5 to 12 carbon atoms, a halohydrocarbon, dioxan, acetonitrile, an ether, dimethylformamide, an excess of the alcohol reactant and an excess of the thiol reactant.

6. A process as claimed in claim 1 in which the base is insoluble in the reaction medium.

7. A process as claimed in claim 6 in which the base is an alkali or alkaline earth metal carbonate or bicarbonate.

8. A process as claimed in claim 1 in which 2,4,6-tri-tert.butylphenol is reacted at 0.5 to 100 atmospheres absolute and at a temperature in the range 10° to 200°C with methanol and with at least one mole per mole of phenol of tertiary alkyl hypochlorite having 4 to 8 carbon atoms and with at least 0.9 mole of sodium carbonate per mole of hypochlorite, the reaction being carried out in excess methanol.

9. A process as claimed in claim 8 in which sodium chloride and unconsumed sodium carbonate are filtered from the methanolic solution of 2,4,6-tri-tert.butyl-4-methoxycyclohexadi-2,5-ene-1-one and the said solution is heated with an acid debutylation catalyst to yield a solution of 2,6-di-tert.butyl-4-methoxyphenol.

* * * * *